(12) United States Patent
Wu (10) Patent No.: US 11,599,221 B2
(45) Date of Patent: Mar. 7, 2023

(54) CONTROL CHIP FOR TOUCH PANEL WITH HIGH SENSITIVITY

(71) Applicant: PixArt Imaging Inc., Hsin-Chu County (TW)

(72) Inventor: Sung-Han Wu, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 391 days.

(21) Appl. No.: 16/991,277

(22) Filed: Aug. 12, 2020

(65) Prior Publication Data
US 2020/0371623 A1 Nov. 26, 2020

Related U.S. Application Data

(63) Continuation of application No. 16/154,153, filed on Oct. 8, 2018, now Pat. No. 10,775,945, which is a continuation of application No. 15/080,718, filed on Mar. 25, 2016, now abandoned.

(30) Foreign Application Priority Data

Mar. 26, 2015 (TW) ................. 104109783

(51) Int. Cl.
*G06F 3/041* (2006.01)
*G06F 3/044* (2006.01)
(52) U.S. Cl.
CPC ........ *G06F 3/041662* (2019.05); *G06F 3/044* (2013.01); *G06F 3/0416* (2013.01)

(58) Field of Classification Search
None
See application file for complete search history.

(56) References Cited

U.S. PATENT DOCUMENTS

| 2013/0106779 | A1  | 5/2013  | Company Bosch et al. |
| 2014/0225866 | A1  | 8/2014  | Noguchi et al. |
| 2017/0364208 | A1  | 12/2017 | King-Smith et al. |
| 2020/0110484 | A1* | 4/2020  | Kim ............ G06F 3/0446 |

FOREIGN PATENT DOCUMENTS

| CN | 101673163 A | 3/2010 |
| CN | 106155435 A | 11/2016 |

* cited by examiner

*Primary Examiner* — Stephen T. Reed
(74) *Attorney, Agent, or Firm* — WPAT, PC (57) ABSTRACT

There is provided a capacitive touch device including a touch panel and a control chip. The touch panel includes a detection electrode configured to form a self-capacitor. The control chip includes an emulation circuit and a subtraction circuit. The emulation circuit is configured to output a reference signal. The subtraction circuit is coupled to the emulation circuit and the detection electrode, subtracts the reference signal outputted by the emulation circuit from a detected signal outputted by the detection electrode to output a differential detected signal, and identifies a touch event according to an amplified differential detected signal so as to improve the touch sensitivity.

16 Claims, 6 Drawing Sheets

CONTROL CHIP FOR TOUCH PANEL WITH HIGH SENSITIVITY

CROSS REFERENCE TO RELATED APPLICATION

This application is a continuation application of U.S. application Ser. No. 16/154,153, filed on Oct. 8, 2018, which is a continuation application of U.S. application Ser. No. 15/080,718, filed on Mar. 25, 2016, which claims the priority benefit of Taiwan Patent Application Serial Number 104109783, filed on Mar. 26, 2015, the full disclosure of which is incorporated herein by reference.

BACKGROUND

1. Field of the Disclosure

This disclosure generally relates to a touch device, more particularly, to a capacitive touch device with high sensitivity and an operating method thereof.

2. Description of the Related Art

Because a user can operate a touch panel by intuition, the touch panel has been widely applied to various electronic devices. In general, the touch panel is classified into capacitive, resistive and optical touch panels.

The capacitive touch sensor is further classified into self-capacitive touch sensors and mutual capacitive touch sensors. These two kinds of touch sensors have different characteristics of the capacitive variation, so they are adaptable to different functions. For example, the mutual capacitive touch sensors are adaptable to the multi-touch detection, and the self-capacitive touch sensors have a higher sensitivity to hovering operations and a lower sensitivity to water drops. However, how to improve the touch sensitivity of these two kinds of capacitive touch sensors is an important issue.

SUMMARY

Accordingly, the present disclosure provides a capacitive touch device with high sensitivity and an operating method thereof.

The present disclosure provides a capacitive touch device and an operating method thereof in which an emulation circuit is arranged in a control chip to generate a reference signal as a cancellation of a detection signal, and thus a size of a detection capacitor in the control chip is reduced.

The present disclosure provides a capacitive touch device and an operating method thereof in which an emulation circuit is arranged in a control chip to generate a reference signal as a cancellation of a detection signal, and thus a touch sensitivity is improved.

The present disclosure provides a control chip for a touch panel. The touch panel includes a detection electrode configured to form a self-capacitor. The control chip includes an input resistor, an amplifying circuit, a subtraction circuit, a switch and an emulation circuit. The input resistor is coupled to an output end of the detection electrode. The amplifying circuit is connected with the input resistor. The switch is connected between the amplifying circuit and the subtraction circuit, and is located downstream of the amplifying circuit. The emulation circuit is configured to output a reference signal to the subtraction circuit. The input resistor and the amplifying circuit form a first filter circuit with the self-capacitor for outputting a detection signal from the amplifying circuit, and the emulation circuit forms a second filter circuit. The subtraction circuit performs a differential operation between the reference signal and the detection signal outputted from the amplifying circuit in a self-capacitive mode to improve touch sensitivity, and the differential operation in the self-capacitive mode is performed by coupling the subtraction circuit to the amplifying circuit using the switch. A detection operation is performed in a mutual-capacitive mode by bypassing the subtraction circuit, and the subtraction circuit is bypassed by decoupling the subtraction circuit from the amplifying circuit using the switch.

The present disclosure further provides a control chip for a touch panel. The touch panel includes a plurality of detection electrodes respectively configured to form a self-capacitor. The control chip includes an emulation circuit, a plurality of programmable filters, a plurality of switches and a subtraction circuit. The emulation circuit is configured to output a reference signal. The plurality of programmable filters is respectively coupled to signal outputs of the detection electrodes. The plurality of switches is respectively located downstream of the programmable filters and connected to the programmable filters. The subtraction circuit is connected to the emulation circuit and located downstream of the plurality of switches. The subtraction circuit performs a differential operation in a self-capacitive mode for outputting a differential detected signal according to the reference signal outputted by the emulation circuit and a detection signal outputted by the coupled programmable filter, and the differential operation in the self-capacitive mode is performed by coupling the subtraction circuit to the programmable filters sequentially using the plurality of switches. A detection operation is performed in a mutual-capacitive mode by bypassing the subtraction circuit, and the subtraction circuit is bypassed by decoupling the subtraction circuit from the plurality of programmable filters using the plurality of switches The present disclosure further provides a control chip for a touch panel. The touch panel includes a detection electrode configured to form a capacitor. The control chip includes an input resistor, an amplifying circuit, a subtraction circuit, a switch and an emulation circuit. The input resistor is coupled to an output end of the detection electrode. The amplifying circuit is connected with the input resistor. The switch connected between the amplifying circuit and the subtraction circuit, and the switch is located downstream of the amplifying circuit. The emulation circuit is configured to output a reference signal to the subtraction circuit. The capacitor, the input resistor and the amplifying circuit form a first filter circuit for outputting a detection signal from the amplifying circuit, and the emulation circuit forms a second filter circuit. In identifying a rough position of an approaching object, the subtraction circuit performs a differential operation between the reference signal and the detection signal, and the differential operation is performed by coupling the subtraction circuit to the amplifying circuit using the switch. In identifying a fine position of the approaching object after the rough position is identified, a detection operation is performed by bypassing the subtraction circuit, and the subtraction circuit is bypassed by decoupling the subtraction circuit from the amplifying circuit using the switch.

A capacitive touch device of the present disclosure is adaptable to a touch device which uses only a self-capacitive detection mode, and to a touch device which uses a dualmode detection including the self-capacitive detection mode and a mutual capacitive detection mode.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 1:
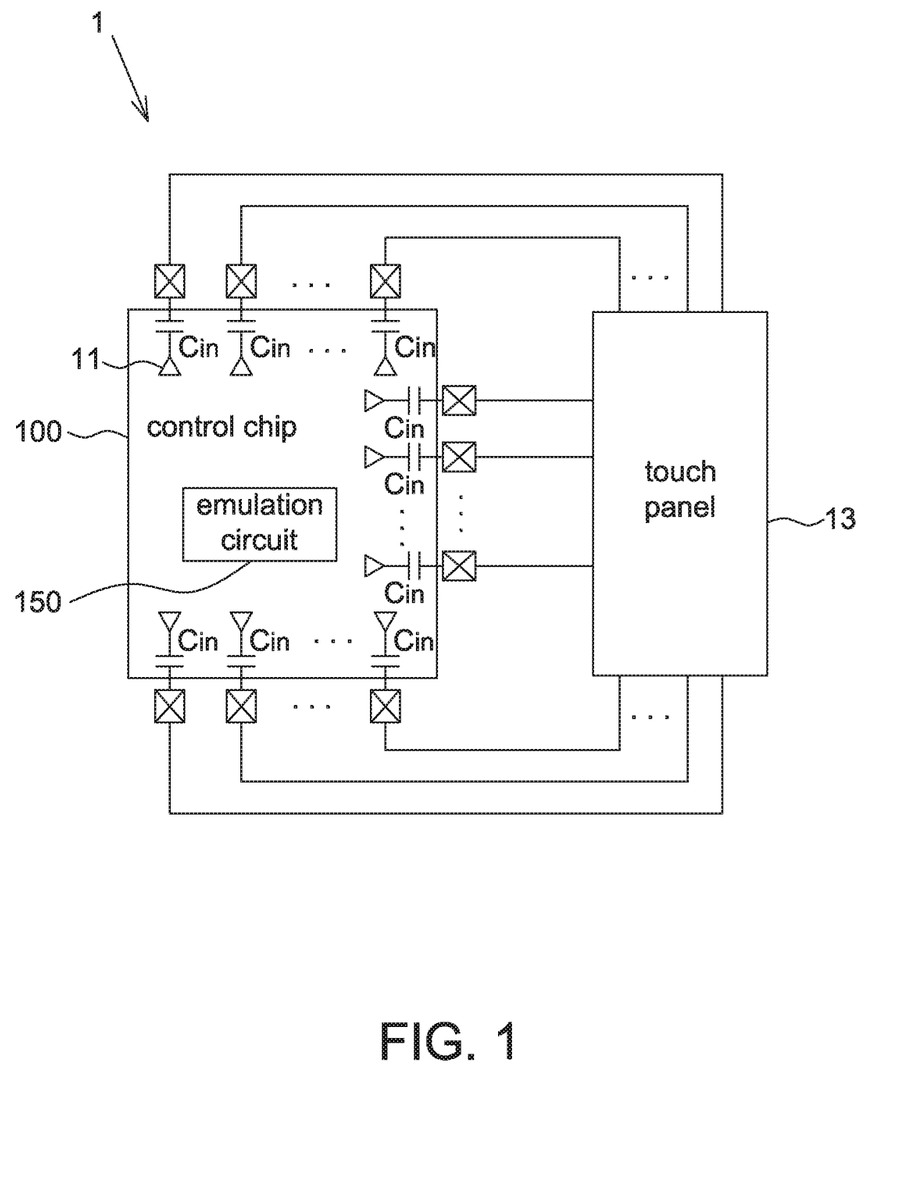
FIG. 1 is a schematic block diagram of a capacitive touch device according to one embodiment of the present disclosure.

Please refer to FIG. 1, it is a schematic block diagram of a capacitive touch device according to one embodiment of the present disclosure. The capacitive touch device 1 includes a control chip 100 and a touch panel 13, wherein the capacitive touch device 1 is preferably able to detect by a self-capacitive mode. In some embodiments, the capacitive touch device 1 is able to detect approaching objects and distinguish touch positions by successively using a self-capacitive mode and a mutual capacitive mode. For example, in some embodiments, because a scanning interval of the self-capacitive mode is short, the capacitive touch device 1 is able to identify whether any object is approaching using the self-capacitive mode. After an approaching object is identified, a touch position is identified using the mutual capacitive mode. In other embodiments, the capacitive touch device 1 is able to identify a rough position of an approaching object and determine a window of interest (WOI) on the touch panel 13 with the self-capacitive mode, and then identify a fine position within the window of interest with the mutual capacitive mode to reduce data amount to be processed in the mutual capacitive mode. It should be mention that implementations of the self-capacitive mode and the mutual capacitive mode mentioned above are only intended to illustrate, but not to limit the present disclosure.

The touch panel 13 includes a plurality of detection electrodes 131 to respectively form a self-capacitor $C_s$, wherein the detection electrodes 131 include a plurality of drive electrodes and a plurality of receiving electrodes extending along different directions, e.g., perpendicular to each other. Mutual capacitors $C_m$ (referring to FIGS. 2 and 3) are formed between the drive electrodes and the receiving electrodes. The principle of forming self-capacitors and mutual capacitors in a capacitive touch panel is known and is not an object of the present disclosure, and thus details thereof is not described herein.

The control chip 100 includes a plurality of drive circuits 11, a plurality of detection capacitors $C_{in}$ and an emulation circuit 150, wherein the emulation circuit 150 is used to emulate the characteristics of the detection line in a self-capacitive mode (described hereinafter). In the self-capacitive mode, the drive circuits 11 and the detection capacitors $C_{in}$ are electrically coupled to signal inputs of the detection electrodes 131 via pins. The drive circuits 11 output a drive signal Sd, e.g., a sine wave, a cosine wave or a square wave to the detection electrodes 131. In a mutual capacitive mode, only the drive circuit 11 corresponding to the drive electrode outputs the drive signal Sd, whereas the drive circuit 11 corresponding to the receiving electrode is bypassed.

Figure 2:
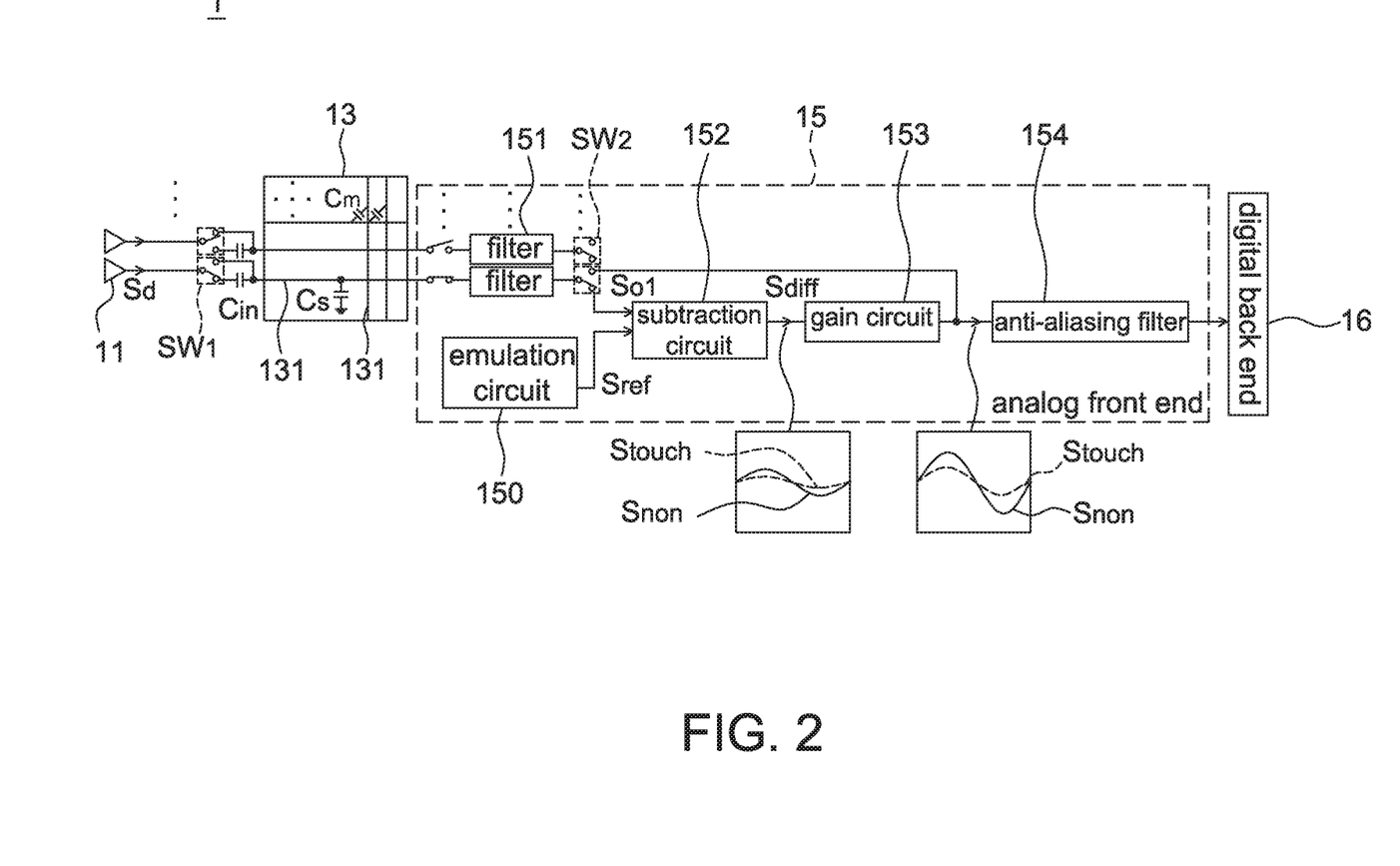
FIG. 2 is a schematic block diagram of a capacitive touch device according to one embodiment of the present disclosure.

Please refer to FIG. 2, it is a schematic block diagram of a capacitive touch device according to one embodiment of the present disclosure. As mentioned above, the capacitive touch device 1 includes a touch panel 13 and a control chip 100. The control chip 100 includes a plurality of drive circuits 11, a plurality of detection capacitors $C_{in}$, an analog front end 15 and a digital back end 16, wherein as the digital back end 16 is not an object of the present disclosure, details thereof are not described herein. In the present disclosure, the drive circuits 11 are able to be electrically coupled to signal inputs of the detection electrodes 131 via the detection capacitors $C_{in}$ (e.g. in the self-capacitive mode) or bypassing the detection capacitors $C_{in}$ (e.g. in the mutual capacitive mode), wherein said coupled to and bypassing the detection capacitors $C_{in}$ is able to be implemented by arranging a plurality of switches $SW_1$ between the drive circuits 11 and the touch panel 13.

Figure 3:
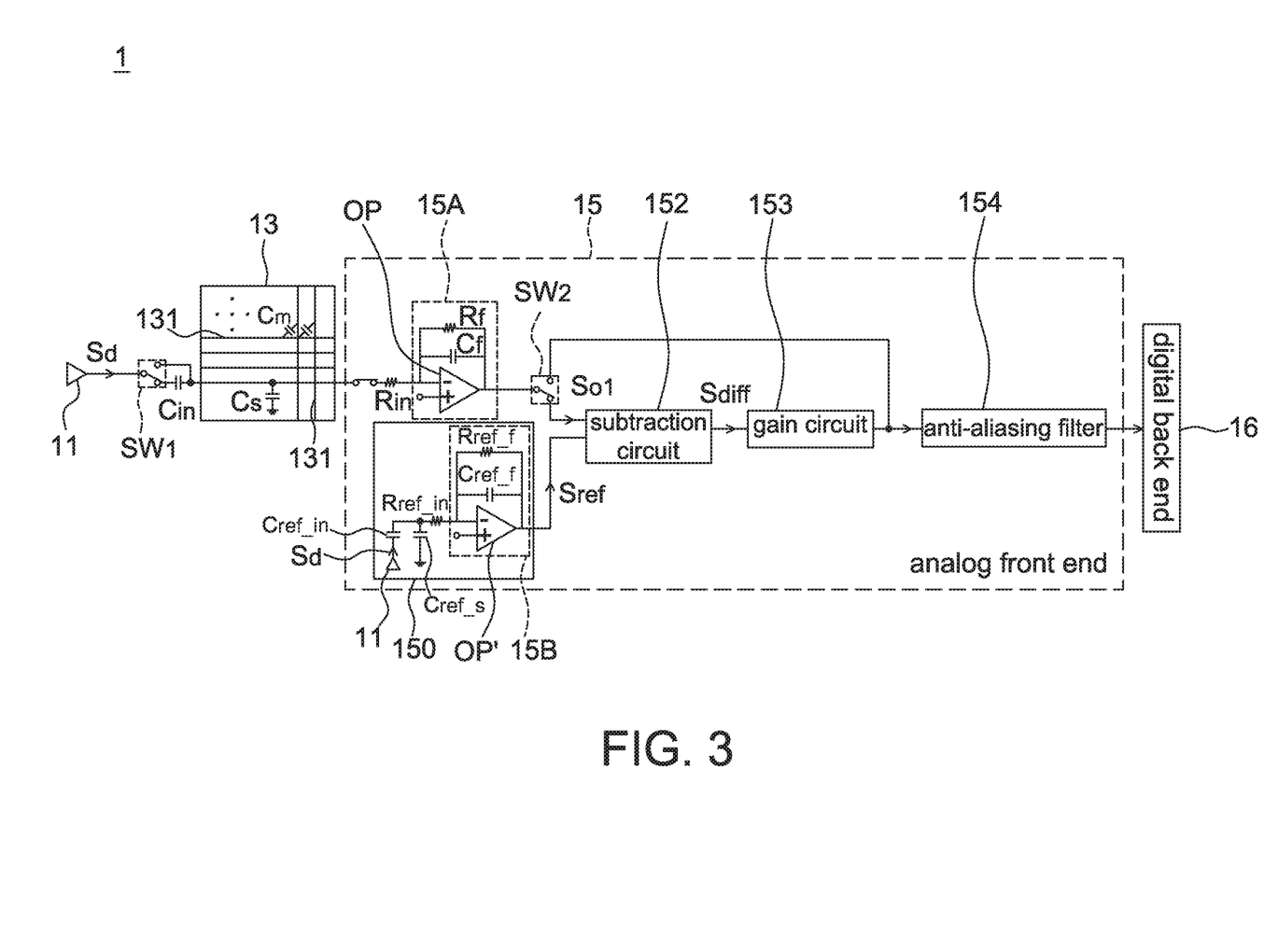
FIG. 3 is another schematic block diagram of a capacitive touch device according to one embodiment of the present disclosure.

The analog front end 15 includes an emulation circuit 150, a plurality of programmable filters 151, a subtraction circuit 52, a gain circuit 153 and an anti-aliasing filter (AAF) 154. The programmable filters 151, the detection capacitors $C_{in}$ and the self-capacitors $C_s$ of the detection electrodes 131 form a first filter circuit, wherein the first filter circuit is, e.g., a band-pass filter (BPF) or a high-pass filter (HPF). The first filter circuit is able to further form a band-pass filter having a predetermined bandwidth with a low-pass filter formed by the anti-aliasing filter 154. In one embodiment, the signal output of each detection electrode 131 is coupled to (e.g. via a switch) one programmable filter 151. It should be mentioned that although only the horizontally arranged detection electrodes 131 shown in FIGS. 2 and 3 are coupled to the programmable filters 151, in other embodiments the programmable filters 151 are also coupled to the longitudinally arranged detection electrodes 131, and the present disclosure is not limited to those shown in FIGS. 2 and 3.

The emulation circuit 150 forms a second filter circuit and outputs a reference signal $S_{ref}$, wherein the second filter circuit is, e.g., a band-pass filter or a high-pass filter. The second filter circuit is able to further form a band-pass filter having a predetermined bandwidth with a low-pass filter formed by the anti-aliasing filter 154. The subtraction circuit 152 is coupled to the emulation circuit 150 and is sequentially and electrically coupled to the programmable filters 151 via switches $SW_2$ in a self-capacitive mode to be further electrically coupled to the detection electrodes 131. The subtraction circuit 152 performs a differential operation on the reference signal $S_{ref}$ outputted by the emulation circuit 150 and a detection signal $S_{o1}$ outputted by the coupled programmable filter 151 to output a differential detected signal $S_{diff}$. To be more precisely, in the present disclosure, the detection capacitors $C_{in}$ are respectively and electrically coupled to signal inputs of the detection electrodes 131 via a plurality of switches (e.g. $SW_1$), and the subtraction circuit 152 is respectively and electrically coupled to the programmable filters 151 and the detection electrodes 131 via a plurality of switches (e.g. $SW_2$).

In the present disclosure, the detection capacitor $C_{in}$ is disposed in the control chip 100 to form the voltage division with the self-capacitor $C_s$. Accordingly, the capacitive touch device 1 identifies a touch event according to a variation of peak-to-peak values of the differential detected signal $S_{diff}$, wherein the differential detected signal $S_{diff}$ is a continuous signal. Before a touch event is identified, the differential detected signal $S_{diff}$ is further filtered or digitized. For example, FIG. 2 shows the touched differential detected signal $S_{touch}$ and the non-touched differential detected signal $S_{non}$. However, as the self-capacitor $C_s$ is generally very large, an effective voltage division is implemented by using a large detection capacitor $C_{in}$. Therefore, the considerable disposition space in the chip for the large capacitor is necessary such that a total size of the control chip 100 is unable to be reduced.

Figure 4A:
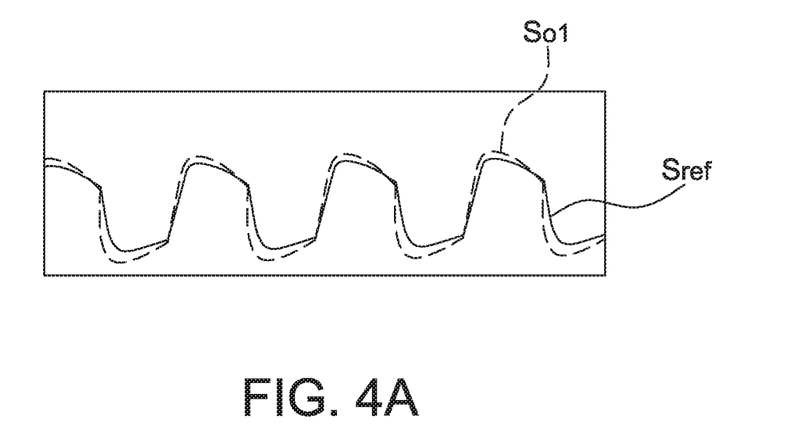
FIG. 4A is the waveform of a detection signal and a reference signal in the capacitive touch device of the embodiments of FIGS. 2 and 3.

Accordingly, in the present disclosure, the circuit characteristics of the detection line (e.g. from the drive circuit 11 via the detection capacitor $C_{in}$, the detection electrode 131 and the programmable filter 151) is emulated by disposing the emulation circuit 150 to output the reference signal $S_{ref}$ as a cancellation of the detection signal $S_{o1}$, as shown in FIG. 4. The capacitance of the detection capacitor $C_{in}$ is able to be decreased by subtracting the cancellation from the detection signal $S_{o1}$. For example, the capacitance of the detection capacitor $C_{in}$ is preferably smaller than 10 percent of capacitance of the self-capacitor $C_s$. Therefore, the size of the control chip 100 is effectively decreased.

To make a difference between the touched differential detected signal $S_{touch}$ and the non-touched differential detected signal $S_{non}$ be more obvious, in some embodiments a gain circuit 153 is employed to amplify the differential detected signal $S_{diff}$, wherein a gain of the gain circuit 153 is determined according to an analytical range of an analog-to-digital convertor (ADC) of the digital back end 16, but not limited thereto. As shown in FIG. 2, the difference between the touched differential detected signal $S_{touch}$ and the non-touched differential detected signal $S_{non}$, which are signals (i.e. differential detected signal) outputted by the gain circuit 153, is increased such that a touch event is easier to be identified. The anti-aliasing filter 154 filters the amplified differential detected signal and, as mentioned above, the anti-aliasing filter 154 is, for example, a low-pass filter.

Please refer to FIG. 3, it is another schematic block diagram of a capacitive touch device according to one embodiment of the present disclosure, wherein FIG. 3 further shows an implementation of the emulation circuit 150 and the programmable filter 151.

Figure 4B:
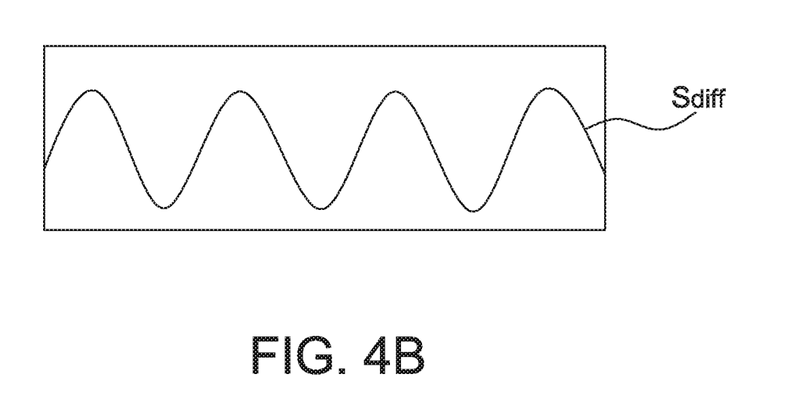
FIG. 4B is a waveform of a differential detected signal of the detection signal and the reference signal in FIG. 4A.

In some embodiments, the programmable filter 151 includes an input resistor $R_{in}$ and an amplifying circuit 15A, wherein the detection capacitor $C_{in}$, the self-capacitor $C_s$, the input resistor $R_{in}$ and the amplifying circuit 15A form a first filter circuit, and the emulation circuit 150 forms a second filter circuit. As mentioned above, the subtraction circuit 152 performs a differential operation on a detection signal $S_{o1}$ outputted by the first filter circuit and a reference signal $S_{ref}$ outputted by the second filter circuit to output a differential detected signal $S_{diff}$, as shown in FIGS. 4A and 4B, wherein FIG. 4B shows a waveform of a differential detected signal $S_{diff}$ of the detection signal $S_{o1}$ and the reference signal $S_{ref}$ shown in FIG. 4A.

Figure 6:
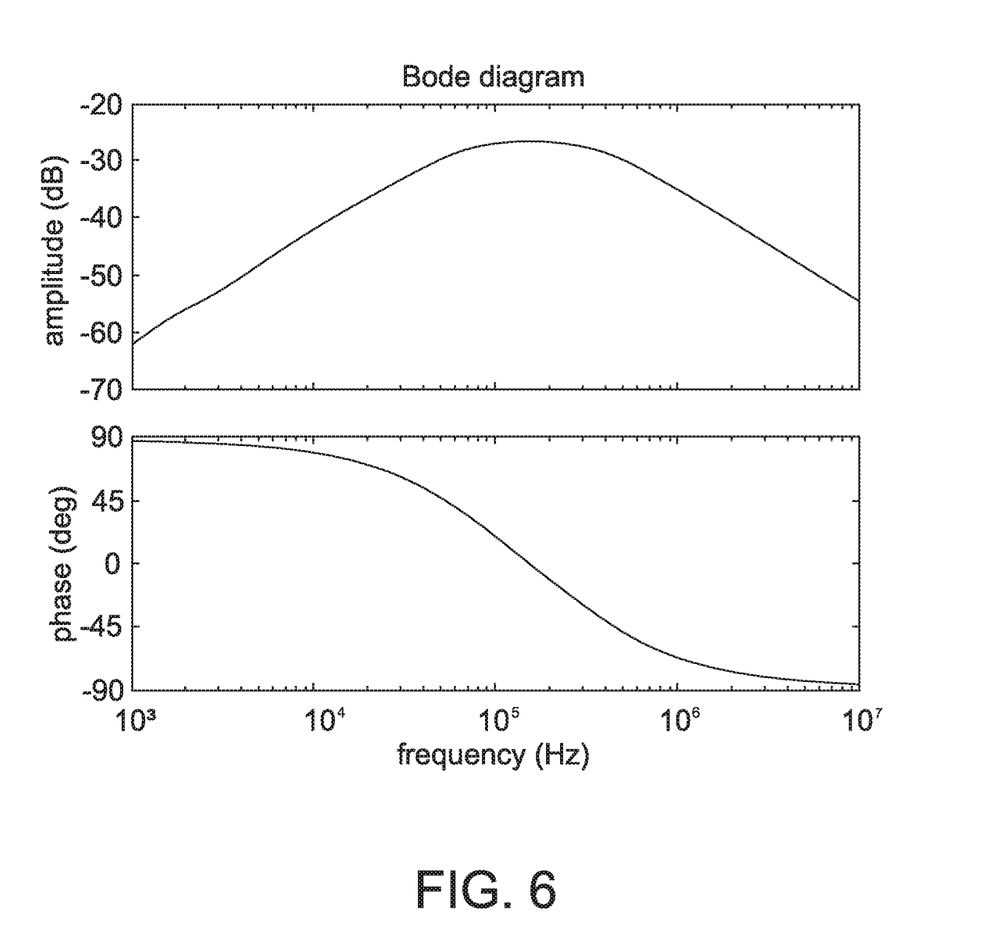
FIG. 6 is a frequency response of a filter circuit of a capacitive touch device according to one embodiment of the present disclosure.

In one embodiment, the amplifying circuit 15A includes an operational amplifier OP, a feedback resistor Rf and a compensation capacitor Cf. The feedback resistor Rf and the compensation capacitor Cf are connected between a negative input and an output of the operational amplifier OP. The input resistor $R_{in}$ is coupled between a second end (i.e. the signal output) of the detection electrode 131 and the negative input of the operational amplifier OP. A first end (i.e. the signal input) of the detection electrode 131 is coupled to the detection capacitor $C_{in}$. In this embodiment, a frequency response of the first filter circuit is indicated by equation (1) and the Bode diagram of FIG. 6, wherein the first filter circuit has two poles and a zero, which is located at 0.

$$(V_{out}/V_{in}) = -(Rf/R_{in}) \times (s \cdot C_{in} \cdot R_{in})/(1+s \cdot Rf \cdot Cf) \times (1+s \cdot R_{in} \cdot C_s + s \cdot R_{in} \cdot C_{in}) \qquad (1)$$

As mentioned above, because an output of the emulation circuit 150 is used as a cancellation of the first filter circuit, the frequency response of the emulation circuit 150 is preferably similar to that of the first filter circuit, i.e. the frequency response of the emulation circuit 150 is determined according to a frequency response of the first filter circuit. In some embodiments, the two frequency responses are similar is referred to, for example, two poles of the emulation circuit 150 being close to two poles of the first filter circuit, but not limited thereto. For example, the two poles of the emulation circuit 150 are determined according to the two poles of the first filter circuit, and because the zero is not affected, only the pole frequencies are considered. For example, differences between pole frequencies of two poles of the emulation circuit 150 and frequencies of poles, which correspond to the two poles of the emulation circuit 150, of the second filter circuit is designed to be below 35 percent of the pole frequencies of the emulation circuit 150, and preferably to be below 20 percent. Although the two poles of the emulation circuit 150 are close to the two poles of the first filter circuit as much as possible, since it is difficult to precisely know the self-capacitor $C_s$ of each detection electrode 131 in advance, the emulation circuit 150 is designed by estimation.

In one embodiment, the emulation circuit 150 includes an emulation detection capacitor $C_{ref\_in}$, an emulation self-capacitor $C_{ref\_s}$, an emulation input resistor $R_{ref\_in}$ and an emulation amplifying circuit 15B, and connections between the emulation detection capacitor $C_{ref\_in}$, the emulation self-capacitor $C_{ref\_s}$, the emulation input resistor $R_{ref\_in}$ and the emulation amplifying circuit 15B are arranged based on connections between the detection capacitor $C_{in}$, the self-capacitor $C_s$, the input resistor $R_{in}$ and the amplifying circuit 15A to obtain a similar frequency response without particular limitations, e.g., having identical connections. That is, the emulation self-capacitor $C_{ref\_s}$ is used to emulate self-capacitor $C_s$ of the detection electrode 131, the emulation detection capacitor $C_{ref\_in}$ is used to emulate the detection capacitor $C_{in}$, the emulation input resistor $R_{ref\_in}$ corresponds to the input resistor $R_{in}$, and the emulation amplifying circuit 15B corresponds to the amplifying circuit 15A. It should be mentioned that the circuit parameter of the emulation circuit 150 (i.e. RC value) is not necessary to be completely the same as the circuit parameter of the first filter circuit, as long as the frequency response of the emulation circuit 150 is similar to the frequency response of the first filter circuit, and the detection capacitor $C_s$ is decreased without particular limitations.

The emulation amplifying circuit 15B also includes an operational amplifier OP', an emulation feedback resistor $R_{ref\_f}$ and an emulation compensation capacitor $C_{ref\_p}$, wherein connections of elements in the emulation amplifying circuit 15B are arranged based on those of the amplifying circuit 15A without particular limitations, e.g., having identical connections. Therefore, a second filter circuit formed by the emulation circuit 150 also has a similar frequency response as the equation (1) and the Bode diagram of FIG. 6. The difference is that all element parameters of the emulation circuit 150 are predesigned. Accordingly, positions of two poles are adjustable by changing the element parameters, i.e. resistance and capacitance, of the emulation circuit 150.

Figure 5:
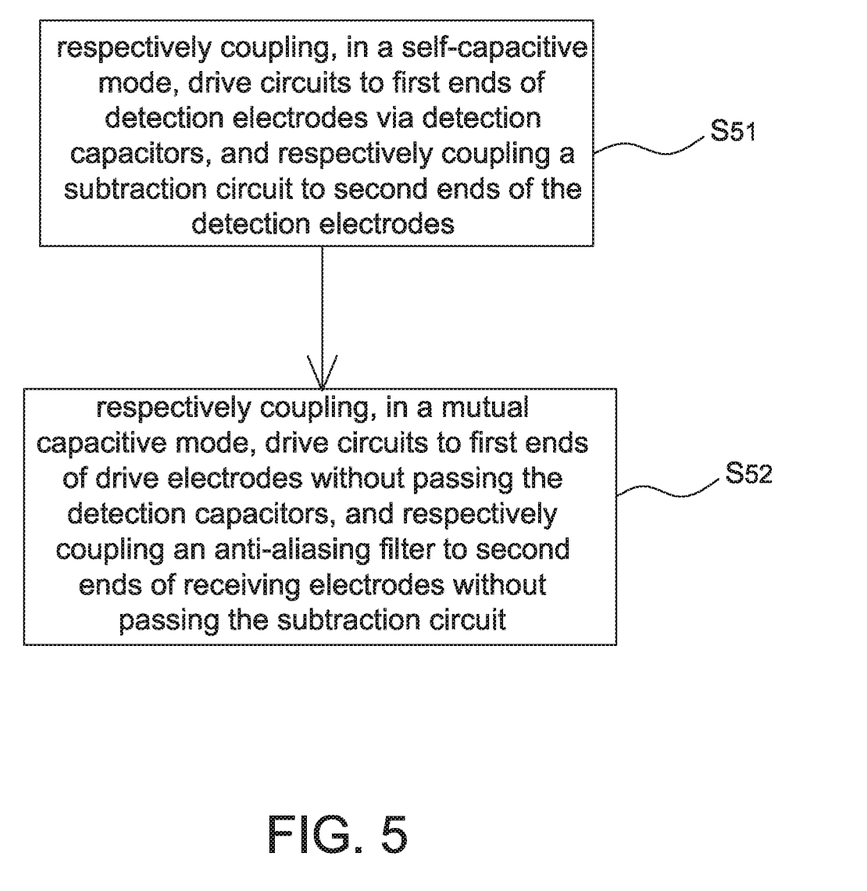
FIG. 5 is a flow chart of an operating method of a capacitive touch device according to one embodiment of the present disclosure.

Please refer to FIG. 5, it is a flow chart of an operating method of a capacitive touch device according to one embodiment of the present disclosure, including a self-capacitive mode (step $S_{51}$) and a mutual capacitive mode (step $S_{52}$). In this embodiment, the self-capacitive mode and the mutual capacitive mode is separately operated, e.g., firstly identifying an approaching object and/or a window of interest (WOI) using the self-capacitive mode and identifying a touch positions and/or a gesture using the mutual capacitive mode.

In the self-capacitive mode, the drive circuits 11 are respectively and electrically coupled to first ends of the drive electrodes via the detection capacitors $C_{in}$, and the subtraction circuit 152 is respectively and electrically coupled to second ends of the drive electrodes. Meanwhile, because the subtraction circuit 152 receives a reference signal $S_{ref}$ outputted by the emulation circuit 150 and the subtraction circuit 152 is electrically coupled to the second end of the drive electrodes via a programmable filter 151, the subtraction circuit 152 performs a differential operation on a detection signal $S_{o1}$ outputted by the programmable filter 151 and the reference signal $S_{ref}$ outputted by the emulation circuit 150 to output a differential detected signal $S_{diff}$, as shown in FIGS. 4A and 4B. Then, a gain circuit 153 amplifies the differential detected signal $S_{diff}$ to make a difference between a touched differential detected signal $S_{touch}$ and a non-touched differential detected signal $S_{non}$ be more significant, as shown in FIG. 2. Furthermore, in one embodiment, a touch event is identified by detecting detection signals outputted by a plurality of drive electrodes or a plurality of receiving electrodes to operate in a shorter scanning period.

In another embodiment, detection signals outputted by a plurality of drive electrodes and a plurality of receiving electrodes are detected to identify a window of interest (WOI) on the touch panel in a self-capacitive mode. Therefore, in the self-capacitive mode, the drive circuits 11 are respectively and electrically coupled to the first ends (i.e. signal inputs) of the receiving electrodes via the detection capacitors $C_{in}$, and the subtraction circuit 152 is sequentially and electrically coupled to second ends (i.e. signal outputs) of the receiving electrodes. The window of interest is determined after identifying the drive electrode and the receiving electrode that sense an approaching object. As mentioned above, in the present disclosure the drive electrodes and the receiving electrodes are both belong to the detection electrodes 131 to generate mutual capacitors $C_m$ therebetween.

In the mutual capacitive mode, the drive circuits 11 are respectively and electrically coupled to the first ends of the drive electrodes without passing the detection capacitors $C_{in}$. For example in FIGS. 2 and 3, the drive circuits 11 bypass the detection capacitor $C_{in}$ using a switch $SW_1$ and directly input the drive signal $S_d$ to the detection electrode 131. Besides, the anti-aliasing filter 154 is respectively and electrically coupled to the second ends of the drive electrodes without passing the subtraction circuit 152. For example in FIGS. 2 and 3, the anti-aliasing filter 154 bypasses the subtraction circuit 152 (and the gain circuit 153) using another switch $SW_2$ to allow the detection signal $S_{o1}$ outputted by the programmable filter 151 to be directly outputted to the anti-aliasing filter 154. The filter parameter of the anti-aliasing filter 154 is determined according to actual applications without particular limitation.

In the present disclosure, in the self-capacitive mode because signals sent to the detection lines do not pass resistors and capacitors of the panel, a phase difference between the reference line (i.e. emulation circuit) and the detection line is not obvious. Therefore, the reference signal $S_{ref}$ is used as a cancellation to be subtracted from a detection signal.

It should be mentioned that, although the amplitude (or peak-to-peak value) of a non-touched differential detected signal $S_{non}$ is shown to be larger than the amplitude (or peak-to-peak value) of a touched differential detected signal $S_{touch}$ in FIG. 2, it is only intended to illustrate but not to limit the present disclosure. According to the parameter setting of the emulation circuit 150 (i.e. RC value), it is possible that the amplitude of the touched differential detected signal $S_{touch}$ is larger than the amplitude of the non-touched differential detected signal $S_{non}$.

It should be mentioned that although the amplitude (or peak-to-peak value) of a detection signal $S_{o1}$ is shown to be larger than the amplitude (or peak-to-peak value) of a reference signal $S_{ref}$ in FIG. 4A, it is only intended to illustrate but not to limit the present disclosure. According to the parameter setting of the emulation circuit 150 (i.e. RC value), it is possible that the amplitude of the reference signal $S_{ref}$ is larger than the amplitude of the detection signal $S_{o1}$.

As mentioned above, how to improve the touch sensitivity of a capacitive touch device is an important issue. Therefore, the present disclosure provides a capacitive touch device (FIGS. 1 to 3) and an operating method thereof (FIG. 5) that generate a cancellation by disposing an emulation circuit in a control chip to decrease a size of a capacitor in the control chip used in the self-capacitive mode and improve the touch sensitivity.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A control chip for a touch panel, the touch panel comprising a detection electrode configured to form a self-capacitor, the control chip comprising:
   an input resistor coupled to an output end of the detection electrode;
   an amplifying circuit connected with the input resistor;
   a subtraction circuit;
   a switch connected between the amplifying circuit and the subtraction circuit, the switch being located downstream of the amplifying circuit; and
   an emulation circuit configured to output a reference signal to the subtraction circuit;
   wherein the input resistor and the amplifying circuit form a first filter circuit with the self-capacitor for outputting a detection signal from the amplifying circuit, and the emulation circuit forms a second filter circuit;

wherein the subtraction circuit performs a differential operation between the reference signal and the detection signal outputted from the amplifying circuit in a self-capacitive mode to improve touch sensitivity, and the differential operation in the self-capacitive mode is performed by coupling the subtraction circuit to the amplifying circuit using the switch; and wherein a detection operation is performed in a mutual-capacitive mode by bypassing the subtraction circuit, and the subtraction circuit is bypassed by decoupling the subtraction circuit from the amplifying circuit using the switch.

2. The control chip as claimed in claim 1, further comprising a gain circuit for amplifying a differential detected signal outputted by the subtraction circuit.

3. The control chip as claimed in claim 2, wherein the control chip is configured to identify a touch event according to a variation of peak-to-peak values of the amplified differential detected signal.

4. The control chip as claimed in claim 1, further comprising a detection capacitor coupled to an input end of the detection electrode, wherein capacitance of the detection capacitor is smaller than 10 percent of capacitance of the self-capacitor.

5. The control chip as claimed in claim 1, wherein
the first filter circuit has two poles each has a pole frequency, and the second filter circuit has two poles each has a pole frequency corresponding to the pole frequencies of the two poles of the first filter circuit; and
wherein differences between the pole frequencies of the two poles of the first filter circuit and that of the second filter circuit are lower than 35 percent of the pole frequencies of the first filter circuit.

6. The control chip as claimed in claim 1, wherein
the amplifying circuit comprises an operational amplifier, a feedback resistor, and a compensation capacitor;
wherein the feedback resistor and the compensation capacitor are connected between a negative input and an output of the operational amplifier, and the input resistor is coupled between the output end of the detection electrode and the negative input of the operational amplifier.

7. The control chip as claimed in claim 1, wherein the emulation circuit comprises:
an emulation detection capacitor connected to a node;
an emulation self-capacitor connected between the node and ground;
an emulation input resistor has a first end connected to the node; and
an emulation amplifying circuit connected to a second end of the emulation input resistor.

8. A control chip for a touch panel, the touch panel comprising a plurality of detection electrodes respectively configured to form a self-capacitor, the control chip comprising:
an emulation circuit configured to output a reference signal;
a plurality of programmable filters respectively coupled to signal outputs of the detection electrodes;
a plurality of switches respectively located downstream of the programmable filters and connected to the programmable filters; and
a subtraction circuit, connected to the emulation circuit and located downstream of the plurality of switches;

wherein the subtraction circuit performs a differential operation in a self-capacitive mode for outputting a differential detected signal according to the reference signal outputted by the emulation circuit and a detection signal outputted by the coupled programmable filter, and the differential operation in the self-capacitive mode is performed by coupling the subtraction circuit to the programmable filters sequentially using the plurality of switches; and wherein a detection operation is performed in a mutual-capacitive mode by bypassing the subtraction circuit, and the subtraction circuit is bypassed by decoupling the subtraction circuit from the plurality of programmable filters using the plurality of switches.

9. The control chip as claimed in claim 8, further comprising a gain circuit for amplifying the differential detected signal.

10. The control chip as claimed in claim 9, wherein the control chip is to identify a touch event according to a variation of peak-to-peak values of the amplified differential detected signal.

11. The control chip as claimed in claim 8, wherein each programmable filter comprises an input resistor and an amplifying circuit.

12. The control chip as claimed in claim 11, further comprising a plurality of detection capacitors respectively coupled to signal inputs of the detection electrodes, wherein each of the programmable filters and the detection capacitors are to form a first filter circuit with the self-capacitor of the coupled detection electrode.

13. The control chip as claimed in claim 12, wherein the emulation circuit is configured to form a second filter circuit, and a frequency response of the second filter circuit is determined according to a frequency response of the first filter circuit.

14. The control chip as claimed in claim 12, wherein capacitance of the detection capacitors is smaller than 10 percent of capacitance of the self-capacitor.

15. The control chip as claimed in claim 12, wherein the detection capacitors are respectively coupled to the signal inputs of the detection electrodes via a plurality of first switches.

16. A control chip for a touch panel, the touch panel comprising a detection electrode configured to form a capacitor, the control chip comprising:
an input resistor coupled to an output end of the detection electrode;
an amplifying circuit connected with the input resistor;
a subtraction circuit;
a switch connected between the amplifying circuit and the subtraction circuit, the switch being located downstream of the amplifying circuit; and
an emulation circuit configured to output a reference signal to the subtraction circuit;

wherein the capacitor, the input resistor and the amplifying circuit form a first filter circuit for outputting a detection signal from the amplifying circuit, and the emulation circuit forms a second filter circuit;

wherein in identifying a rough position of an approaching object, the subtraction circuit performs a differential operation between the reference signal and the detection signal, and the differential operation is performed by coupling the subtraction circuit to the amplifying circuit using the switch; and wherein in identifying a fine position of the approaching object after the rough position is identified, a detection operation is performed by bypassing the subtraction circuit, and the subtraction circuit is bypassed by decoupling the subtraction circuit from the amplifying circuit using the switch.

\* \* \* \* \*